April 15, 1969  W. T. LYNCH  3,439,169
TUNABLE SOLID STATE LASER
Filed Feb. 11, 1965
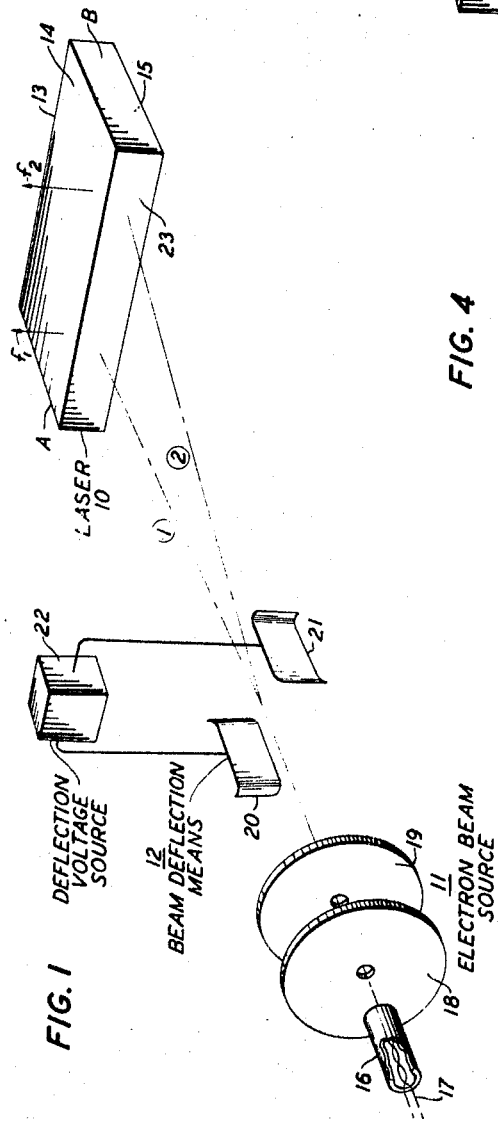
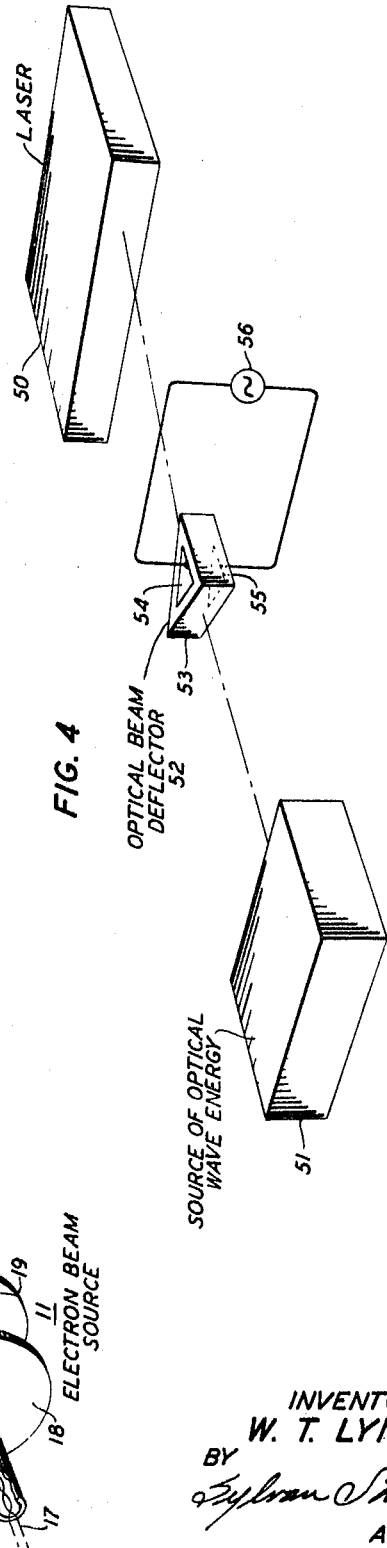
INVENTOR
W. T. LYNCH
BY
Sylvan Sherman
ATTORNEY

United States Patent Office 3,439,169
Patented Apr. 15, 1969

3,439,169
TUNABLE SOLID STATE LASER
William T. Lynch, Summit, N.J., assignor to Bell Telephone Laboratories, Incorporated, New York, N.Y., a corporation of New York
Filed Feb. 11, 1965, Ser. No. 431,864
Int. Cl. H04b 9/00
U.S. Cl. 250—199         10 Claims

ABSTRACT OF THE DISCLOSURE

A tunable, beam-pumped, solid state laser whose lasing frequency is controlled by the positioning of an impinging pumping beam. Tunability is achieved by grading the composition of the laser material over its lengths. As the pumping beam position is changed, a different portion of the sample is excited and caused to lase at a particular frequency that is characteristic of the composition at the portion of the material excited.

Various embodiments are disclosed including a tunable monochromatic light source, a tunable local oscillator for a heterodyne mixer-detector and a variable frequency amplifier.

---

This invention relates to tunable, solid state lasers.

In a paper entitled, "Electron-Beam-Pumped GaAs Laser," by C. E. Hurwitz and R. J. Keyes, published in the Oct. 1, 1964, issue of Applied Physics Letters, the observation of laser action in gallium arsenide, excited by a beam of 50 kev. electrons at liquid helium temperature, is reported. Others have reported laser action in electron-beam-pumped samples of indium antimonide and indium arsenide.

In the electron-beam-pumped laser, the incident high energy electrons produce hole-electron pairs within a narrow region close to the bombarded surface of the laser material. When the electron energy and the beam current supplied by the pumping electron beam are sufficiently high, lasing occurs.

It is an object of the present invention to provide a solid state laser source whose lasing frequency can be continuously varied.

Recognizing that the lasing frequency varies with the composition of the semiconductor material, a continuously tunable solid state laser, in accordance with the present invention, is obtained by continuously varying the composition of the laser material from one end of the sample to the other. By way of example, one end of the sample can be GaAs, whereas the other end can be $GaAs_xP_{1-x}$, where $x$ varies uniformly between the two ends.

By directing a pumping electron beam, or an optical beam, to different portions of the semiconductor material, any desired lasing frequency within the "tuning" range of the material can be obtained. The tuning range may be wide or narrow, depending solely upon the composition range chosen. Thus, "coarse" or "fine" frequency tuning can be achieved. Very fine frequency tuning can be achieved by merely varying the doping impurity concentration across the laser material since the lasing frequency is, to a lesser degree, also dependent upon the impurity concentration.

It is an advantage of the present invention that a continuously variable lasing frequency can be obtained within a single solid-state device simply by deflecting an electron beam. Such a device has utility as a tunable monochromatic light source, as a local oscillator in an optical heterodyne mixer-detector circuit, and as a variable frequency optical amplifier.

These and other objects and advantages, the nature of the present invention, and its various features, will appear more fully upon consideration of the various illustrative embodiments now to be described in detail in connection with the accompanying drawings, in which:

FIG. 1 shows a tunable, electron-beam-pumped laser in accordance with one form of the present invention;

FIG. 4 shows a tunable, optically pumped laser in accordance with another form of the invention.

Figure 2:
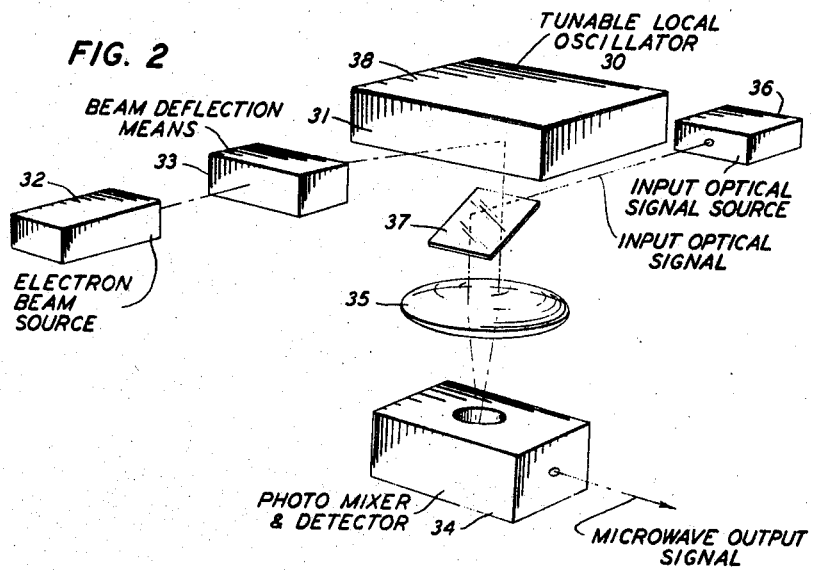
FIG. 2 shows a tunable laser, in accordance with the present invention, utilized as a tunable local oscillator in a heterodyne mixer-detector arrangement.

Referring to FIG. 1, there is illustrated a tunable solid state laser comprising a laser 10, an electron beam pumping source 11, and beam deflection means 12. More specifically, the laser 10 comprises a crystal 13 of semiconductor material having two parallel, polished surfaces 14 and 15, which define the laser cavity. For continuous wave operation, the block is advantageously soldered to a cryostat (not shown) and cooled to aryogenic temperatures.

The electron beam source 11 can be any well-known type of electron gun. Typically, such a source would include a cathode 16, a heating filament 17 and focusing and accelerating electrodes 18 and 19.

Interposed between the electron beam source 11 and the laser 10 is the beam deflector 12. In FIG. 1, deflector 12 is shown as a pair of deflection plates 20 and 21 connected to a deflection voltage source 22.

It will be recognized by those skilled in the art, that the beam source 11 and the deflection means 12 are only intended to be illustrative and that other arrangements well known in the art can be used for the purposes of provided an electron beam and for controlling the beam direction.

The entire assemblage of FIG. 1 is enclosed in an evacuated enclosure (not shown) and suitable voltages applied to the electron beam source for focusing and directing an electron beam upon a portion of one of the other surfaces 23 of crystal 13. In FIG. 1, surface 23, preferably a cleaned or polished surface, is perpendicular to the two polished surfaces 14 and 15. In response to this excitation, lasing occurs and optical wave energy is emitted in a direction perpendicular to the polished surfaces 14 and 15 which form the optical cavity. By coating one of the surfaces 14 or 15 with a reflective coating, all of the laser output can be directed out of one surface of crystal 13.

As noted hereinabove, the laser frequency is a function of the composition of the laser material. In accordance with the present invention, the laser is made to be continuously tunable by varying the composition of crystal 13 along its length from end A to end B. For example, if the composition of crystal 13 is gradually varied between indium arsenside (InAs) at end A, and gallium arsenide (GaAs) at end B, the wavelength of the wave energy emitted by laser 10 will vary between 38,000 A. and 8400 A. As a second example, a change in composition across crystal 13 from GaAs to $GaAs_{0.5}P_{0.5}$ would permit tuning from 8400 A. to approximately 6000 A.

Graded semiconductors of the type described above can be fabricated, for example, using a system of the type described by W. F. Finch and E. W. Mehal in their paper, "Preparation of $GaAs_xP_{1-x}$ by Vapor Phase Reaction," published in the July 1964 issue of the Journal of the Electrochemical Society, starting at page 814, wherein the relative amounts of arsenic and phosphorus vapor supplied to the substrate are continuously varied.

The embodiment of FIG. 1 is utilized as a tunable source of coherent monochromatic wave energy, by changing the direction of the electron beam, thereby causing the electron beam to pump a different portion of crystal 13. In FIG. 1, two beam directions are illustrated. Direction 1, close to end A, induces oscillations at frequency $f_1$. Direction 2, close to end B, induces oscillations at frequency $f_2$. For this application, the deflection voltage source 22, connected to the deflection plates 20 and 21, is simply a variable direct current voltage source. Alternatively, the deflection voltage source 22 can be a modulation source for producing a frequency modulated output from the laser.

FIG. 2 illustrates the invention used as a tunable local oscillator in a heterodyne mixer-detector arrangement. The laser 30 includes an element 31 of active laser material whose composition varies across its length. Portions of the laser are selectively pumped by means of an electron beam derived from a suitable electron beam source 32. The local oscillator is tuned by changing the direction of the electron beam and thereby pumping a different portion of element 31. The direction of the electron beam is controlled by the beam deflection means 33.

The output from the tunable electron-beam-pumped laser 30 is focused upon a photo-mixer and detector 34, by means of a lens 35. Photo-mixer 34 can be a photo-traveling wave tube, a photo-klystron, a photo-multiplier or a photo-diode. Also focused upon photo-mixer 34 is an input optical signal, shown being derived from an input optical signal source 36. In an optical communications system, source 36 can be the terminal end of an optical waveguide. A half-silvered mirror 37 is used to align the two optical waves.

It will be noted that the relative sizes of the various components are distorted for purposes of illustration. In practice the laser 30 is of the order of a few millimeters long and a fraction of a millimeter thick.

The two optical signals mix in photo-mixer 34 to produce a difference frequency output signal. Typically, the output signal is in the microwave frequency range and is so indicated in FIG. 2. (For a discussion of optical heterodyne detection of light waves see, for example, "Optical Heterodyne Detection of Microwave Modulated Light," March 1964, Proceedings of the Institute of Electrical and Electronics Engineers, pages 303–304.)

For continuous wave operation, laser 30 is advantageously operated at cryogenic temperatures and, as described above, is contained within an evacuated enclosure along with the electron beam source 32 and the beam deflection means 33. For more efficient operation, the upper surface 38 of laser 30 is covered with a reflective coating so that all of the laser output is directed downward toward the photo-mixer 34.

Heretofore, the absence of a tunable local oscillator has limited the practical use of optical heterodyning. The tunable, electron-beam-pumped laser oscillator described herein provides a simple, optical local oscillator whose range of tuning is limited only by the composition of the laser material.

Figure 3:
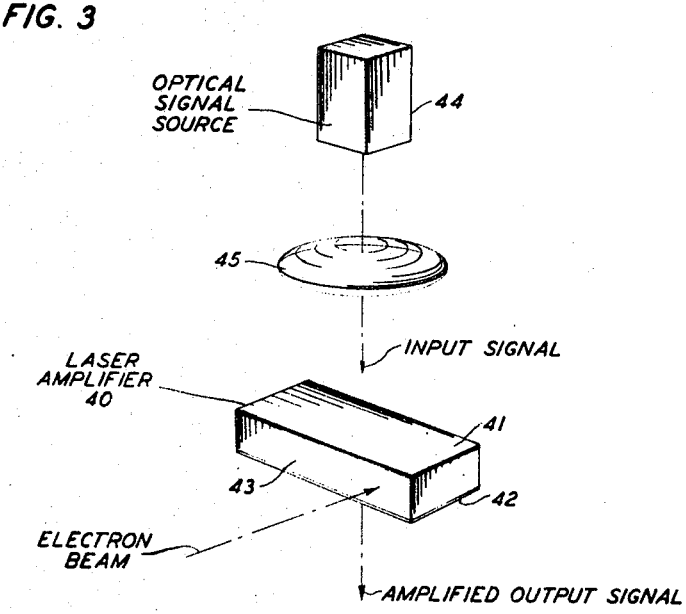
FIG. 3 shows a laser, in accordance with the invention, used as a tunable amplifier.

In FIG. 3 the principles of the tunable electron-beam-pumped laser are adapted for use as a tunable optical wave amplifier. As an amplifier, there are two modes of operation. In the first mode, the electron-beam intensity is simply reduced below the threshold level required for oscillations. In the second mode of operation, the structure is modified by the addition of antireflecting coatings to the polished surfaces in a manner similar to that suggested by J. W. Crowe and R. M. Craig, Jr., in their paper entitled, "Small-Signal Amplification in GaAs Laser," published in the Feb. 1, 1964, Applied Physics Letters, pages 57–58. It is an advantage of the second mode of operation that the use of antireflecting coatings raises the threshold level, thereby permitting the use of high beam currents which results in higher gain.

FIG. 3 illustrates a laser amplifier 40 including antireflection coatings 41 and 42 deposited over the polished surfaces of a crystal 43 of laser material. The coatings are advantageously of the order of a quarter of a wavelength thick at the signal frequency, although the exact thickness of the coatings is not critical. Typical of the materials that are used for this purpose are SiO and $SiO_2$.

The input signal to be amplified, derived from an optical signal source 44, is directed upon one of the antireflecting surfaces 41 of laser 40. An amplified output signal is derived from the opposite surface 42 of the laser.

Typically, the input signal, whose frequency lies within the tuning range of the amplifier, illuminates the entire upper surface 41 of the laser. The amplified output signal is derived from that portion of the laser whose composition corresponds to the frequency of the input signal. To enhance the effectiveness of the amplifier, means, such as a focusing lens, can be provided to focus the input signal upon the appropriate portion of crystal 43.

In amplifiers having a large tuning range, the thickness of the antireflecting coating is advantageously tapered across the crystal 43 in order to maintain the preferred thickness at the operating frequency as the amplifier is tuned to the frequency of the applied signal.

In the various illustrative embodiments described above, electron beam pumping was used. However, it is to be understood that optical pumping can be used as an alternative to electron beam pumping in each of these illustrative embodiments. (See, "Evidence of Stimulated Emission in Ruby-Laser Pumped GaAs" by J. J. Schlickman, M. E. Fitzgerald and K. H. Kinston, published in the December 1964 Proceedings of the Institute of Electrical and Electronic Engineers, pages 1739–1740.)

An optically pumped, tunable laser, as illustrated in FIG. 4, comprises a laser 50 of semiconductor material of varying composition, a source 51 of optical pumping energy, and an optical beam deflector 52.

Source 51 can be any optical source whose photon energy is greater than the band gap of the semiconductor material anywhere along its length. Typically, though not necessarily, source 51 itself can be a solid state or gaseous laser.

Associated with source 51, though not shown, are the necessary lenses for projecting and focusing the optical beam upon laser 50.

Tuning of the laser is accomplished, as described hereinabove, by changing the direction of the pumping beam and causing it to pump different portions of the semiconductor material. In the illustrative embodiment of FIG. 4, deflection of the optical beam is accomplished by means of an electro-optical deflection prism 53 of the type described by F. S. Chen et al. in an article entitled "The Use of Perovskite Paraelectrics in Beam Deflectors and Light Modulators," published in the October 1964 issue of the Proceedings of the Institute of Electrical and Electronic Engineers, pages 1258 to 1259. As explained in this article, a simple beam deflector can be made from a prism of electro-optical material such as, for example, potassium tantalate-niobate (KTN), by the application to the prism of an electric field. In FIG. 4, the electric field is applied transversely to the direction of propagation of the optical beam by means of a pair of electrodes 54 and 55 connected to a deflection voltage source 56.

The operation of the optically pumped laser of FIG. 4 is the same as the electron-beam-pumped laser described hereinabove. Lasing occurs at that portion of the laser being pumped and at a frequency determined by the composition of the laser material at the pumping site.

In all cases it is understood that the abovedescribed arrangements are illustrative of but a small number of the many possible specific embodiments which can represent applications of the principles of the invention. Thus, it is recognized that various other arrangements can readily be devised in accordance with these principles by those skilled in the art without departing from the spirit and scope of the invention.

What is claimed is:

1. A tunable solid-state laser comprising:
   an element of active laser material characterized in that the composition of said element varies over its length;

means for pumping a region of said element for producing laser action at said region at a frequency determined by the composition of said element at said region;

and deflection means for tuning said laser by changing the region of said element being pumped.

2. The laser according to claim 1 wherein said pumping means comprises a beam of optical wave energy; and wherein said deflection means comprises a prism of electro-optical material.

3. A tunable solid-state, electron-beam-pumped laser comprising, within an evacuated enclosure;

an element of active laser material characterized in that the composition of said element varies over its length;

an electron beam source;

means for focusing and directing said beam onto said sample;

and deflection means for changing the position of said electron beam along the length of said sample.

4. A tunable laser comprising:

a block of semiconductor material having a pair of parallel, polished surfaces characterized in that the composition of said block varies from one end thereof to the other end thereof;

an electron beam source;

means for directing said beam upon a portion of a surface of said block perpendicular to said polished surfaces for pumping said portion of said block of semiconductor material;

and means for changing the direction of said electron beam for pumping another portion of said block of semiconductor material of different composition.

5. The laser according to claim 4 wherein the composition of said semiconductor material is given as $GaAs_xP_{1-x}$, where $x$ varies between one and approximately 0.5 as a function of the distance along said surface from the ends of said block.

6. The laser according to claim 4 wherein the impurity concentration of said semiconductor material varies along said block.

7. A frequency modulated optical source comprising:

an element of active laser material whose composition varies along its length;

means for pumping a portion of said element comprising an electron beam;

a modulation signal source;

and beam deflection means for changing the portion of said element being pumped in response to said modulation signal source.

8. In combination:

a tunable local oscillator comprising an element of active laser material whose composition varies from one end of said element to the other end thereof;

an electron beam source for pumping a portion of said element to produce an optical local oscillator signal;

beam deflection means for changing the portion of said element being pumped;

a photo-mixer;

an input optical signal source;

and means for directing said optical local oscillator signal and an input optical signal derived from said optical signal source onto said photo-mixer to produce an output signal whose frequency is equal to the difference between the frequencies of said local oscillator signal and said input signal.

9. A tunable laser amplifier comprising:

an element of active laser material whose composition varies along its length;

said amplifier adapted for receiving an input signal on a first surface of said element and for extracting an amplified output signal from a second surface of said element parallel to said first surface;

an electron beam source for pumping a portion of said element below the threshold level for oscillations;

and deflection means for changing the portion of said element being pumped.

10. The amplifier according to claim 9 wherein said first and second surfaces are covered with anti-reflecting material.

References Cited

UNITED STATES PATENTS

| 2,589,704 | 3/1952 | Kirkpatrick. | |
| 2,683,794 | 7/1954 | Briggs. | |
| 3,248,669 | 4/1966 | Dumke. | |
| 3,317,848 | 5/1967 | Keyes | 330—4.3 |
| 3,321,631 | 5/1967 | Biard. | |
| 3,333,146 | 7/1967 | Dill | 250—199 XR |
| 3,339,073 | 8/1967 | Hunter | 250—199 |

FOREIGN PATENTS 530,777  12/1940  New Zealand.

OTHER REFERENCES

H. H. Klinger, Proceedings of the IEEE, Amplification and Generation of Coherent Light by Means of Electron Beams, October 1963, p. 1367.

I. Melngailis, IEEE, Semiconductor Diode Masers of $(In_xGa_{1-x})As$, August 1963, p. 1154.

D. A. Cusano, Applied Physics Letter, Recombination Scheme and Intrinsic Gap Variation in $GaAs_{1-x}P_x$ Semiconductors From Electron Beam, October 1964, p. 144, vol. 5, No. 7.

ROBERT L. GRIFFIN, *Primary Examiner.*

ALBERT J. MAYER, *Assistant Examiner.*

U.S. Cl. X.R.

313—108; 331—94.5; 332—7.51